United States Patent
Sung et al.

(10) Patent No.: US 7,693,269 B2
(45) Date of Patent: Apr. 6, 2010

(54) CALLER IDENTIFICATION METHOD, AND BILLING SYSTEM AND METHOD USING THE SAME IN INTERNET TELEPHONY

(75) Inventors: Jongmo Sung, Daejon (KR); Do-Young Kim, Daejon (KR); Young-Sun Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1230 days.

(21) Appl. No.: 11/229,468

(22) Filed: Sep. 15, 2005

(65) Prior Publication Data

US 2006/0120345 A1    Jun. 8, 2006

(30) Foreign Application Priority Data

Dec. 6, 2004    (KR) ...................... 10-2004-0101920

(51) Int. Cl.
H04M 1/56    (2006.01)
H04M 15/06    (2006.01)

(52) U.S. Cl. ............................... 379/142.05; 379/93.03; 713/182

(58) Field of Classification Search ............... 379/93.02, 379/93.03, 93.17, 93.23, 111, 114.01, 114.03, 379/115.01, 121.01, 142.01, 142.04, 142.06, 379/142.15, 142.17, 188, 182, 194, 197, 379/199–200; 713/156, 161, 176–177, 180, 713/182–184
See application file for complete search history.

(56) References Cited

U.S. PATENT DOCUMENTS 6,324,271 B1 * 11/2001 Sawyer et al. .......... 379/142.05
6,463,534 B1 * 10/2002 Geiger et al. ............... 713/168
7,254,708 B2 * 8/2007 Silvester ..................... 713/170
2002/0056050 A1 * 5/2002 Heiden et al. ............... 713/201
2006/0120345 A1 * 6/2006 Sung et al. .................. 370/351

FOREIGN PATENT DOCUMENTS

| KR | 1997-0060805 | 8/1997 |
| KR | 1999-0042727 | 6/1999 |
| KR | 1020010069332 A | 7/2001 |
| KR | 1020020032519 A | 5/2002 |
| KR | 1020002051613 A | 6/2002 |
| KR | 2003-0002472 | 1/2003 |

OTHER PUBLICATIONS

"Use status and Prospects of Korean Electronic Signature Certifying Technology" by C.E.O Lee, Hong sub; *Korea Institute of Communication Sciences*, vol. 20, Item 1; Jan. 2003 Abstract.

* cited by examiner

*Primary Examiner*—Binh K Tieu
(74) *Attorney, Agent, or Firm*—Blakely, Sokoloff, Taylor & Zafman

(57) ABSTRACT

A caller identification system provides a caller identifier of an actual user rather than the conventional telephone number dependent on a caller terminal. Further, a caller base billing method and its system can bill an actual user by carrying out user authentication through a certification authority for a caller identifier that is independent of a caller terminal. The method includes the steps of receiving authentication information of the caller from a caller terminal; verifying the authentication information; and carrying out call setup if the authentication information and the certificate match, wherein the authentication information is generated by using a caller identifier and a private key that are applied by the caller, with no dependency on the caller terminal, and caller information corresponding to the caller identifier is transmitted to a callee terminal during call setup.

19 Claims, 5 Drawing Sheets

CALLER IDENTIFICATION METHOD, AND BILLING SYSTEM AND METHOD USING THE SAME IN INTERNET TELEPHONY

FIELD OF THE INVENTION

The present invention relates to an Internet telephony technique; more particularly, to a caller identification method, and a caller-based billing system and method using the same in the Internet telephony.

DESCRIPTION OF RELATED ART

The Voice communication service is considered as the most important and basic service in communication service area from the conventional PSTN to the recent mobile telephony service. In the recent network environment, we can be provided with bandwidths of several megabytes per second to several tens of megabytes per second at home through high speed network technologies such as a Digital Subscriber Line (DSL), a cable modem and the like. The Internet telephony service converts voice information into packets to combine the voice communication service to data communication service on the Internet, rather than transferring the voice information with the conventional circuit switching. Recently, data and image information in addition to the voice information can be transferred through an Internet Protocol (IP) based Internet network.

So far, users use the Internet telephony service mainly because of lower charge but there is dissatisfaction due to inconvenience in use and poorer call quality than the conventional wired telephony service. However, such a problem is being improved through bandwidth increase with the high speed Internet, technical development such as call quality improvement, and restriction appeasement such as granting a receiving number to the VoIP users.

Most of the conventional telephony service such as the wired telephony, the mobile telephony and the Internet telephony identify and charge the bill in caller terminal basis. That is, the telephone number that is assigned to the caller terminal is displayed on the callee terminal, and billing is carried out for the subscriber of the corresponding caller terminal. Therefore, when a number of users would like to share one terminal, the above identification and billing scheme cannot be done in user basis because that the same caller number is displayed on the callee terminal without regard to the actual user and the service bill is charged without regard to the user but with regard to the telephone number of the terminal. In other words, when the caller is not the subscriber of the caller terminal, the callee terminal cannot display the corresponding caller information and the service bill cannot be charged to the actual user of the caller terminal.

SUMMARY OF THE INVENTION

It is, therefore, an object of the present invention to provide a caller identification system for providing a caller identifier of an actual user rather than the conventional telephone number that is dependent on a caller terminal, by carrying out user authentication through a certificate authority (CA) for a caller identifier that is independent of a caller terminal.

Further, it is another object of the present invention to provide a method for billing an actual user by carrying out user authentication through a certificate authority for a caller identifier that is independent of a caller terminal, and a billing system thereof.

In accordance with an aspect of the present invention, there is provided a method for identifying a caller for use in an Internet telephony system, the method including the steps of: receiving authentication information of the caller from a caller terminal; verifying the authentication information by using the received authentication information and a certificate of the caller; and carrying out call setup if the authentication information and the certificate match, wherein the authentication information is generated by using a caller identifier and a private key that are applied by the caller, with no dependency on the caller terminal, and caller information corresponding to the caller identifier is transmitted to a callee terminal at call setup.

In accordance with another aspect of the present invention, there is provided a method for caller-base billing for use in an Internet telephony system, the method including the steps of: receiving authentication information of a caller from a caller terminal; verifying the authentication information by using the received authentication information and a certificate of the caller; carrying out call setup if the authentication information and the certificate match; and storing billing information for the caller when the call is ended, wherein the authentication information is generated by using a caller identifier and a private key that are applied by the caller, with no dependency on the caller terminal, and caller information corresponding to the caller identifier is transmitted to a callee terminal at call setup.

In accordance with still another aspect of the present invention, there is provided a caller-based billing system for the Internet telephony, the system including: a call-processing server for verifying authentication information that is received from a caller terminal by using the received authentication information and a certificate that is received from a certificate server, and carrying out call setup if the authentication information and the certificate match; and a billing server for storing billing information for the caller, that is received from the call-processing server when the call is ended, wherein the authentication information is generated by using a caller identifier and a private key from the caller with no dependency on the caller terminal.

In accordance with still another aspect of the present invention, there is provided an Internet telephony terminal comprising: an authentication information generator for generating authentication information of a caller to transmit to a call-processing server; and a call setup requesting unit for requesting call setup from the call-processing server if the call-processing server determines that the authentication information and a certificate match, wherein the authentication information is generated with a caller identifier and a private key that are entered by the caller with no dependency on the Internet telephony terminal, and caller information corresponding to the caller identifier is displayed on a callee terminal by the authentication information.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
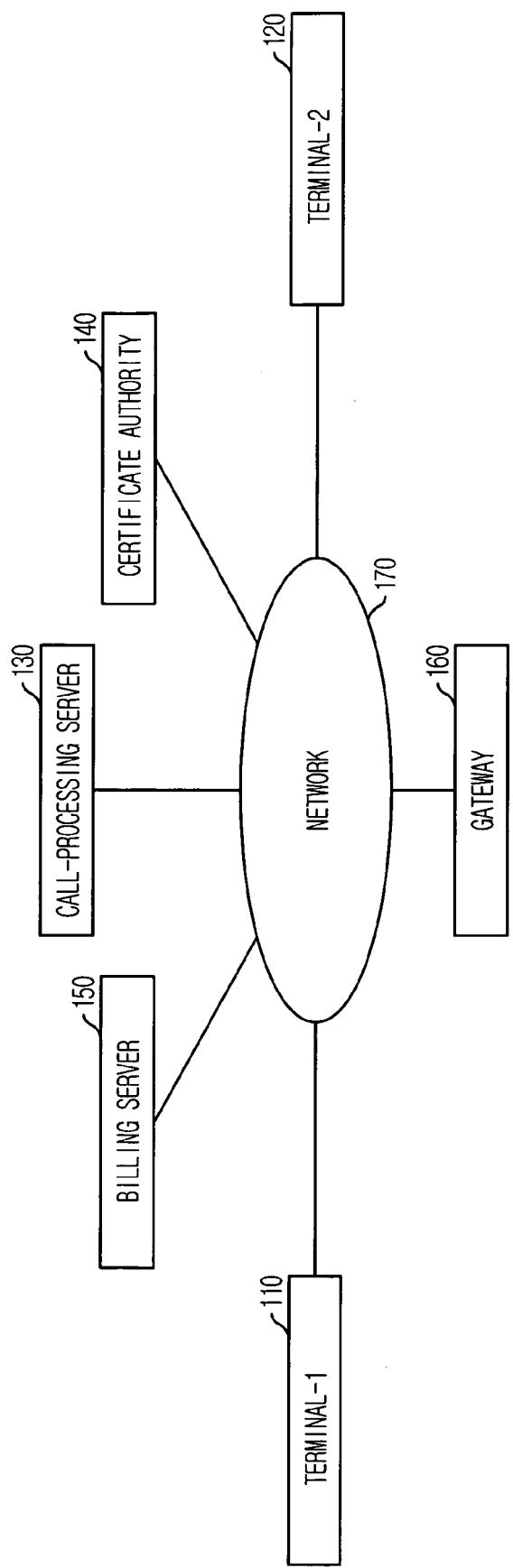
FIG. 1 is a network configuration for identifying a caller in an Internet telephony and billing the identified caller in accordance with an embodiment of the present invention.

FIG. 1 is a network configuration for identifying a caller in an Internet telephony and billing the identified caller in accordance with an embodiment of the present invention. The network system of the present invention includes a terminal-1 110, a terminal-2 120, call-processing server 130, a certificate authority (CA) 140, a billing server 150, and a gateway 160, all those being connected to each other through a network 170 including the Internet.

The terminal-1 110 and the terminal-2 120 are connected to the Internet for providing Voice over Internet Protocol (VOIP) services. The terminal-1 110 and the terminal-2 120 may be a PC on which a software program for the Internet telephony is installed, or a telephone on which a separate Internet telephony function is installed. The terminal-1 110 and the terminal-2 120 receive voice from users, which is to be transferred to the other party, through microphones, and recover the voice of the other party, which is played back to speakers. In the following, for the purpose of descriptive convenience, the terminal-1 110 is referred to as a caller terminal and the terminal-2 120 is referred to as a callee terminal.

The caller terminal as the terminal-1 110 receives a caller identifier and his/her private key from a caller to generate authentication information.

The caller may insert a portable storage medium, in which the identifier and the private key are stored, into the terminal0-1 110, in order to enter his/her own identifier and private key. The portable storage medium may be any suitable medium that can be used as connected to the Internet telephony terminal, including a smart card and an IC card. Alternatively, the caller may enter his/her own identifier and private key through entering a password for extracting the identifier and private key when his/her own identifier and private key are previously stored in the storage within the terminal-1 110. It is desirable to issue the caller identifier and the private key from a certificate authority.

Figure 2:
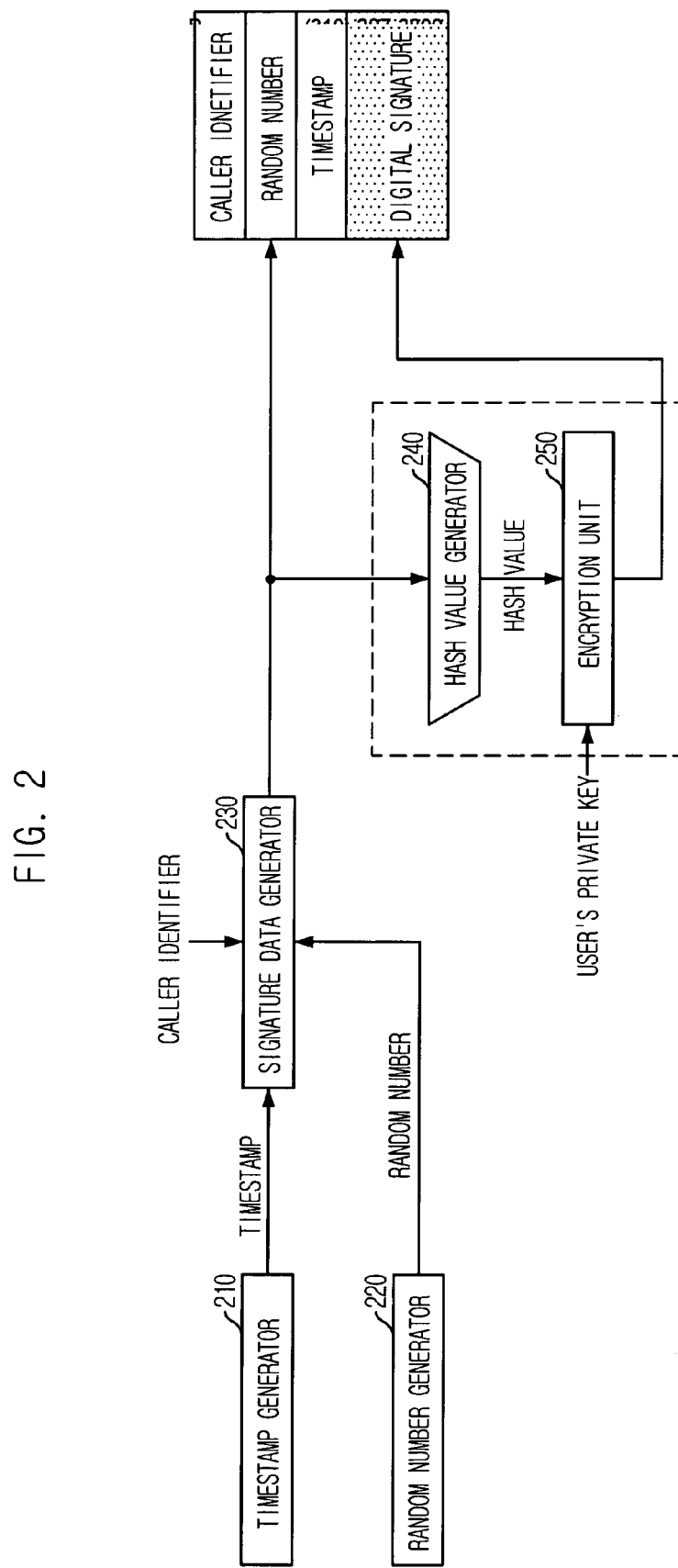
FIG. 2 is a block diagram of an authentication information generator in accordance with an embodiment of the present invention.

The authentication information generator in the terminal-1 110 includes a timestamp generator 210, a random number generator 220, a signature data generator 230, a hash value generator 240, and an encryption unit 250, as shown in FIG. 2. The timestamp generator 210 generates a timestamp to use for a digital signature, generally, by using system time of a terminal or time information that is obtained from a timestamp server through the network. The random number generator 220 generates a random number. The signature data generator 230 generates digital signature data by combining the caller identifier from the caller, the random number from the random number generator 220, and the timestamp from the time stamp generator 210. The hash value generator 240 computes a hash value, being an output of a one-way function, having a certain length, by using the signature data from the signature data generator 230. The encryption unit 250 generates a digital signature by encrypting the hash value with using the private key of the caller. Consequently, the authentication information from the authentication information generator is composed of the caller identifier+the random number+the timestamp+the digital signature.

Accordingly, the terminal-1 110 generates the authentication information having caller identification information independent of the caller terminal.

The call-processing server 130 verifies the caller authentication information from the terminal-1 110 and establishes call setup for telephony connection between the terminals 110, 120.

Figure 3:
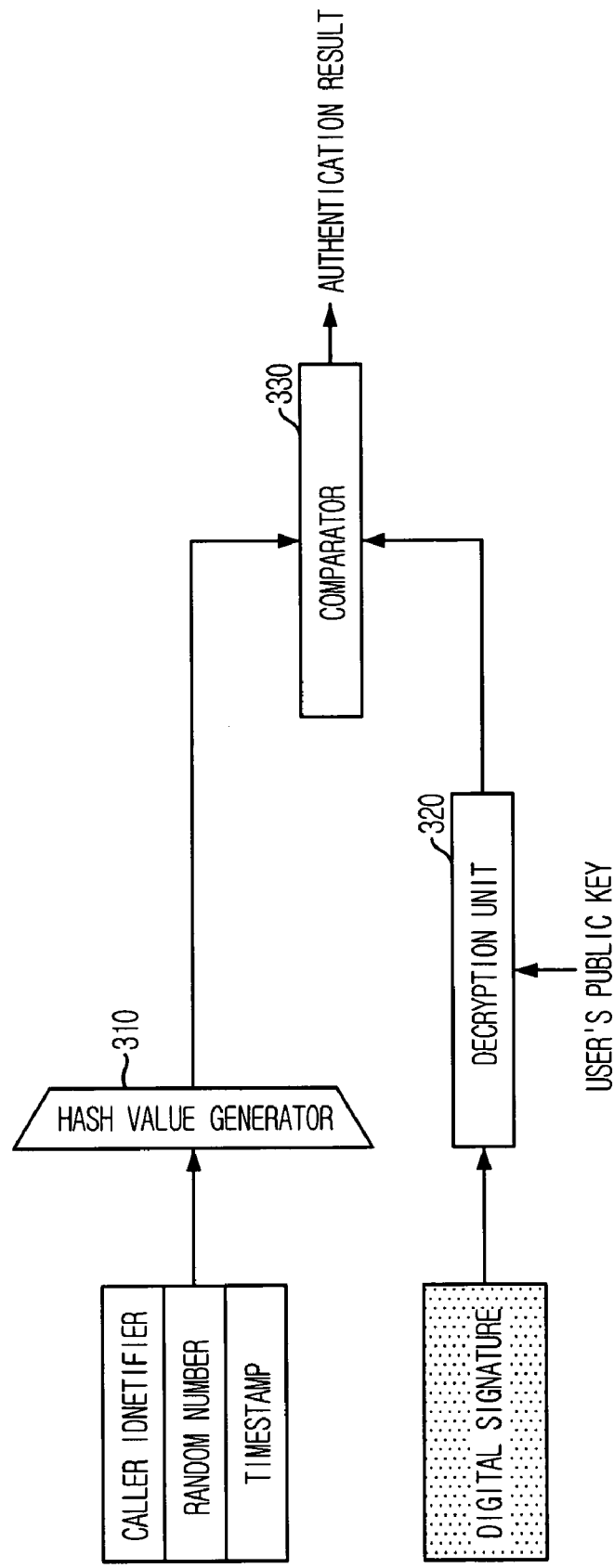
FIG. 3 is a block diagram of an authentication information verifier in accordance with an embodiment of the present invention.

FIG. 3 is a block diagram of an authentication information verifier in the call-processing server 130. The authentication information verifier includes a hash value generator 310, a decryption unit 320, and a comparator 330. The received caller authentication information is divided into the signature data (caller identifier+the random number+the timestamp) and its digital signature, which are respectively applied to the hash value generator 310 and the decryption unit 320. The hash value generator 310 employs the same rule as used for the hash value generator 240 of the authentication information generator. The decryption unit 320 carries out decryption of the digital signature with a public key of the caller. The comparator 330 compares the output of the hash value generator 310 with the output of the decryption unit 320 in order to create authentication result.

On the other hand, when the call-processing server 130 attempts to establish call setup, the caller identification information is transmitted to the callee terminal as the terminal-2 120 and the caller information is displayed on a display device of the terminal-2 120. Accordingly, the callee can have the caller information without regard to the caller terminal. The caller information that is displayed on the terminal-2 120 could be the caller identifier that is entered into the terminal-1 110 but it is desirable to display the caller information as somehow processed to allow the callee to confirm it readily. The call-processing server 130 transfers billing information including call-start time, call-end time, and the caller identifier to the billing server 150.

The certificate authority 140 manages the certificate for each user, and issues the certificate in response to a request of the call-processing server 130 to allow the call-processing server to use the certificate in verifying the authentication information of the caller.

The billing server 150 stores billing information including the time for which the caller is actually served, and the caller identifier information. By using the billing information, it can be possible to bill in caller based without regard to the caller terminal.

The gateway 160 transfers voice data flow between the terminals 110, 120.

Figure 4A:
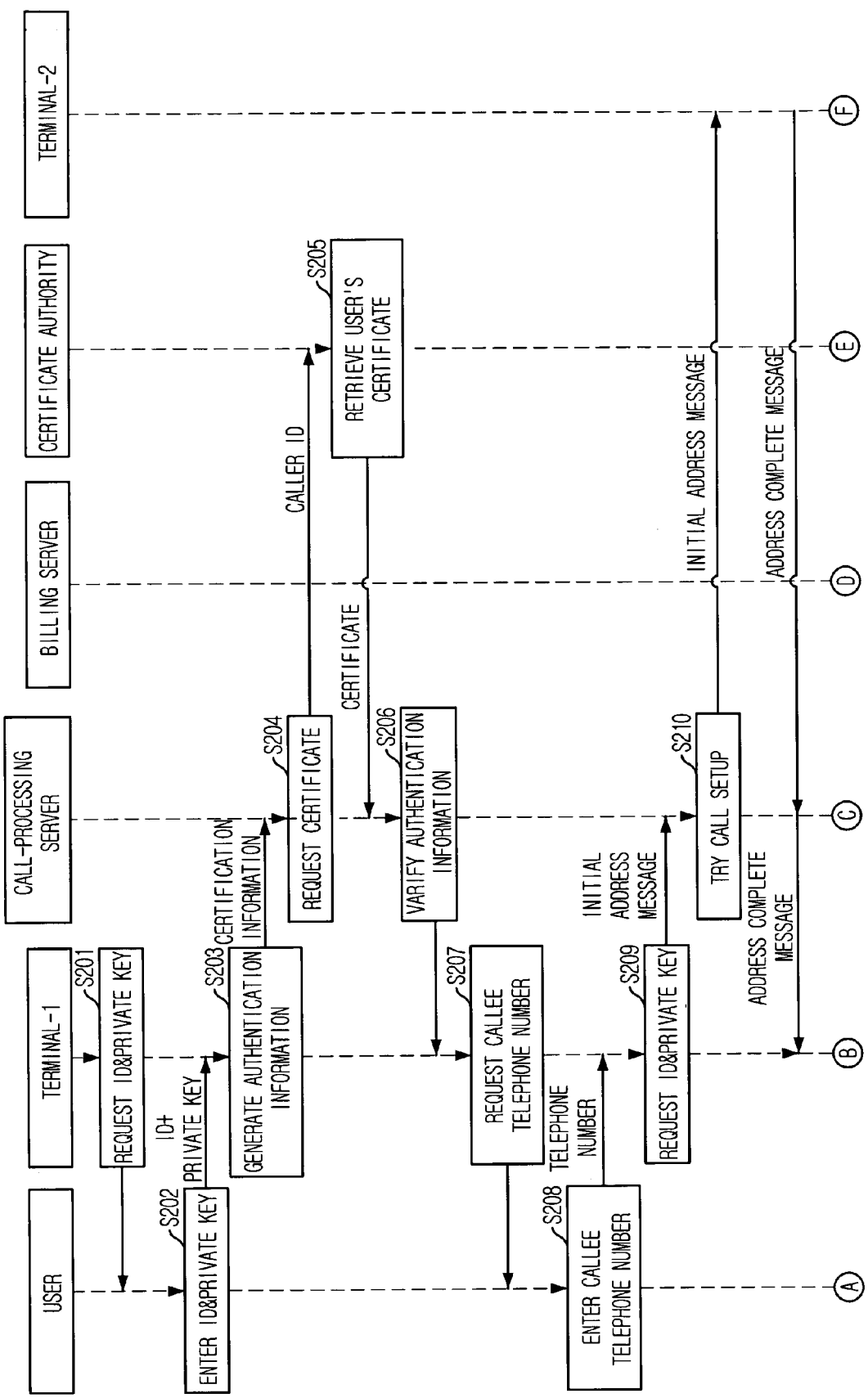
FIGS. 4A and 4B are flowcharts for caller-based identification and billing method in the Internet telephony in accordance with an embodiment of the present invention.
Figure 4B:
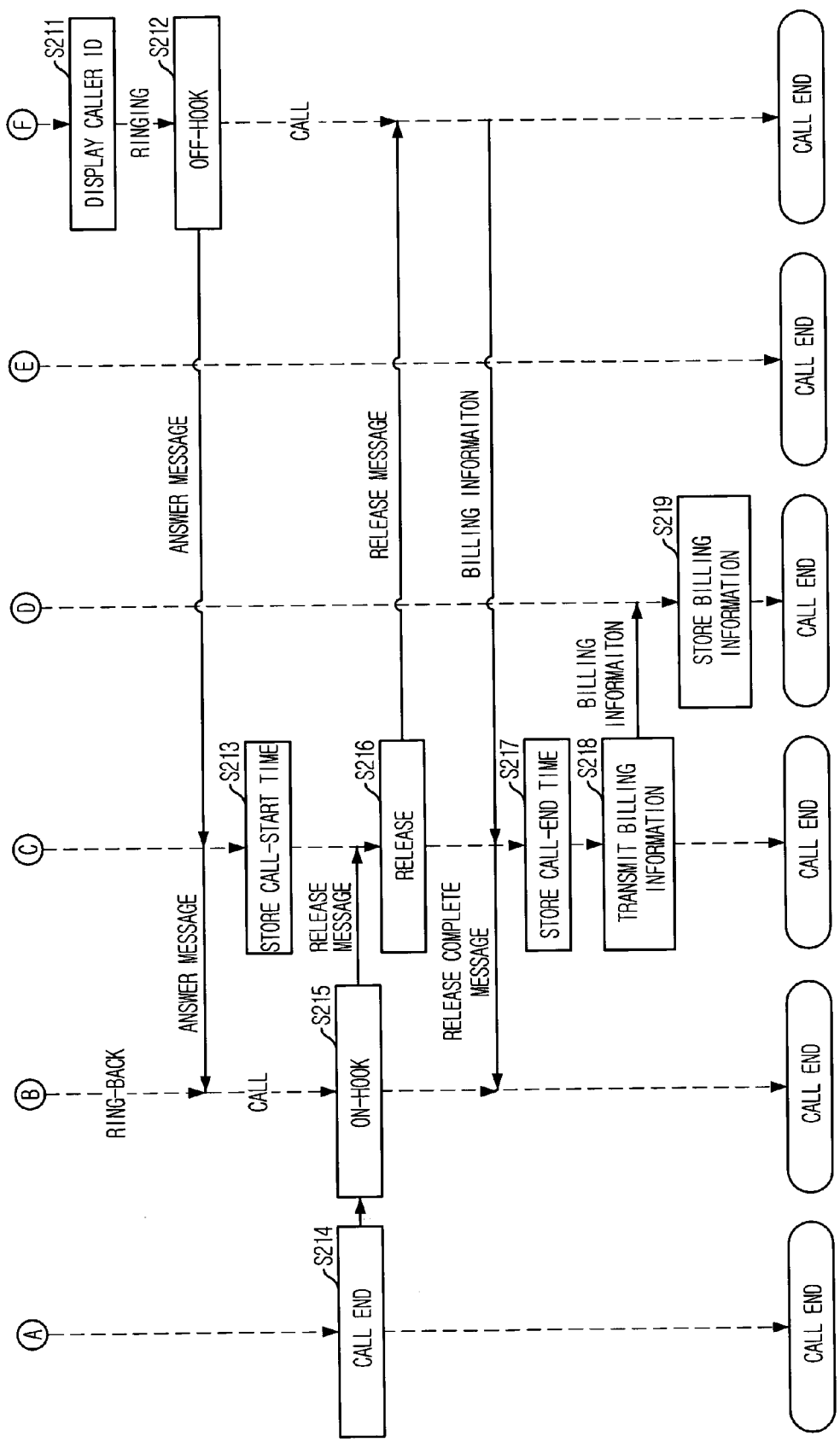

FIGS. 4A and 4B are flowcharts for caller identification and billing in the Internet telephony in accordance with an embodiment of the present invention.

The terminal-1 110 as the caller's terminal requests the caller identifier (ID) and the private key from the caller at step S201. The terminal-1 110 generates the authentication information by using the identifier and the private key that are received from the caller at steps S202, S203. The generated authentication information is transferred to the call-processing server 130.

The call-processing server 130 extracts the caller identifier that is contained in the authentication information from the terminal-1 110. Then, it requests the certificate corresponding to the caller identifier from the certificate authority 140 at step S204. The certificate authority 140 retrieves the certificate corresponding to the received caller identifier in order to transfer the retrieved certificate to the call-processing server 130 if there are the requested certificate at step S205. The call-processing server 130 extracts the public key of the caller from the certificate that is received form the certificate server 140, verifies the authentication information that is received from the terminal-1 110 by using the extracted public key, and transfers the authentication result to the terminal-1 110 at step S206.

If the authentication fails, the terminal-1 110 displays error message to the calling user and terminates the call attempt. When the authentication succeeds, the terminal-1 110 requests the caller to enter the callee telephone number at step S207. It will be understood by those skilled in the art that a unique identifier of the callee with which the callee can be recognized would be entered instead of the callee telephone number. When the caller enters the callee telephone number at step S208, the terminal-1 110 requests call setup from the call-processing server 130 to make a call to the terminal corresponding to the entered telephone number at step S209.

The call-processing server 130 attempts the call setup with the callee's terminal corresponding to the received telephone number at step S210. At this point, the call-processing server 130 transmits an Initial Address Message (IAM) including the caller identifier to the terminal-2 120 corresponding to the callee party. When the terminal-2 120 receives the initial address message, it transmits an Address Complete Message (ACM) to the call-processing server 130 and the call-processing server 130 then transfers the address complete message to the terminal-1 110. When the terminal-1 110 receives the address complete message, it produces ring-back-tone. The terminal-2 120 displays caller information that is contained in the initial address message on its screen and produces ringing at step S211. When the callee picks up the phone, i.e., in off-hook state, the terminal-2 120 transmits an Answer Message (ANM) to the call-processing server 130 at step S212. The call-processing server 130 transfers the answer message to the terminal-1 110 and stores the call-start time at step S213. When the terminal-1 110 receives the answer message, the call setup is completed and then the caller and the callee can have voice communication with the respective terminals 110, 120.

When the caller or callee terminates the call at step S214, a call-teardown is requested from one of the terminals 110, 120 on-hook at step S215. Then, one of the terminals 110, 120 transmits a release message to the call-processing server 130 and, in turn, the call-processing server 130 transmits the release message to the other party to attempt call release at step S216. When the other party terminal receives the release message, it transmits a Release Complete (RLC) message to the call-processing server 130. When the call-processing server 130 receives the release complete message, it transmits call processing release message to the party that originally requested call release, and stores call-end time at step S217. The call-processing server 130 transfers the billing information containing the caller identifier, the call-start time, and the call-end time to the billing server 150 at step S218. The billing server 150 stores the received billing information at step S219 and then the caller identification and corresponding billing process are terminated.

As described above, in the present invention, service dependency on a particular terminal of the Internet telephony service subscriber can be eliminated. That is, the caller information corresponding to the actual caller can be displayed on the callee terminal even if one terminal is shared among many callers. Further, service bill can be charged to the actual caller.

The present application contains subject matter related to Korean patent application No. 2004-0101920, filed with the Korean Intellectual Property Office on Dec. 6, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for identifying a caller for use in an Internet telephony system, the method comprising the steps of:
   receiving authentication information of the caller from a caller terminal;
   verifying the authentication information by using the received authentication information and a certificate of the caller, wherein the step of verifying the authentication information includes:
   extracting a public key for the caller from the certificate;
   dividing the received authentication information into signature data and a digital signature; and
   producing a hash value for the signature data;
   decrypting the digital signature by using the extracted public key; and
   comparing the hash value with the decrypted value to output an authentication result; and
   carrying out call setup if the verified authentication information and the certificate match,
   wherein the authentication information is generated by using a caller identifier and a private key that are applied by the caller, with no dependency on the caller terminal, and
   caller information corresponding to the caller identifier is transmitted to a callee terminal at the call setup.

2. The method of claim 1, wherein the caller identifier and the private key are entered by inserting a portable storage medium into the caller terminal, when the caller identifier and the private key are stored in the portable storage medium.

3. The method of claim 1, wherein the caller identifier and the private key are entered by entering a password from the caller, when the caller identifier and the private key are stored in the caller terminal.

4. The method of claim 1, wherein the authentication information is generated by:
   producing signature data with the caller identifier;
   producing a digital signature with the signature data and the private key; and
   concatenating the signature data and its digital signature.

5. The method of claim 1, wherein the certificate is obtained from a certificate authority.

6. The method of claim 1, wherein the step of call setup includes:
   requesting the caller for a callee identifier; creating an initial address message including the caller identifier;
   sending the initial address message to the callee terminal;
   extracting the caller identifier from the initial address message; and,
   displaying the caller identifier on the display device of the callee terminal.

7. A method for caller-based billing for use in an Internet telephony system, the method comprising the steps of:
   receiving authentication information of a caller from a caller terminal;
   verifying the authentication information by using the received authentication information and a certificate of the caller, wherein the step of verifying the authentication information includes:
   extracting a public key for the caller from the certificate;
   dividing the received authentication information into signature data and a digital signature; and
   producing a hash value for the signature data;

decrypting the digital signature by using the extracted public key; and comparing the hash value with the decrypted value to output an authentication result; and carrying out call setup if the authentication information and the certificate match; and storing billing information for the caller when the call is ended, wherein the authentication information is generated by using a caller identifier and a private key that are applied by the caller, with no dependency on the caller terminal, and caller information corresponding to the caller identifier is transmitted to a callee terminal at call setup.

8. The method of claim 7, wherein the billing information includes the caller identifier.

9. The method of claim 8, wherein the billing information further includes call-start time and call-end time.

10. The method of claim 7, wherein the authentication information is generated by producing signature data with the caller identifier, producing a digital signature with the signature data and the private key, and connecting the digital signature to the signature data.

11. A caller-base billing system for the Internet telephony, the system comprising:

a call-processing server for verifying authentication information that is received from a caller terminal by using the received authentication information and a certificate that is received from a certificate server, and carrying out call setup if the authentication information and the certificate match; and a billing server for storing billing information for the caller, that is received from the call-processing server when the call is ended, wherein the call-processing server includes:

a unit configured to extract a public key for the caller from the certificate;

a unit configured to divide the received authentication information into signature data and a digital signature;

a unit configured to produce a hash value for the signature data;

a unit configured to decrypt the digital signature by using the extracted public key; and a unit configured to compare the hash value with the decrypted value to output an authentication result;

wherein the authentication information is generated by using a caller identifier and a private key from the caller with no dependency on the caller terminal.

12. The system of claim 11, wherein the billing information includes the caller identifier.

13. The system of claim 12, wherein the billing information further includes call-start time and call-end time.

14. The system of claim 11, wherein the authentication information is generated by producing signature data with the caller identifier, producing a digital signature with the signature data and the private key, and connecting the digital signature to the signature data.

15. An Internet telephony terminal comprising:

authentication information generating means for generating authentication information of a caller to transmit to a call-processing server; and call setup requesting means for requesting call setup from the call-processing server if the call-processing server determines that the authentication information and a certificate match, wherein the call-processing server includes:

a unit configured to extract a public key for the caller from the certificate;

a unit configured to divide the received authentication information into signature data and a digital signature;

a unit configured to produce a hash value for the signature data;

a unit configured to decrypt the digital signature by using the extracted public key; and a unit configured to compare the hash value with the decrypted value to output an authentication result;

wherein the authentication information is generated with a caller identifier and a private key that are entered by the caller with no dependency on the Internet telephony terminal, and caller information corresponding to the caller identifier is displayed on a callee terminal by the authentication information.

16. The Internet telephony terminal of claim 15, further comprising portable storage medium inserting means for accommodating a portable storage medium, the portable storage medium stores the caller identifier and the private key are stored.

17. The Internet telephony terminal of claim 15, storing the caller identifier and the private key and requesting the caller to enter a password.

18. The Internet telephony terminal of claim 15, wherein the authentication information is generated by producing signature data with the caller identifier, producing a digital signature with the signature data and the private key, and connecting the digital signature to the signature data.

19. The Internet telephony terminal of claim 15, wherein the authentication information generating means generates the signature data by connecting a random number from a random number generator and a timestamp from a timestamp generator to the caller identifier.

* * * * *